(12) United States Patent
Jones et al.

(10) Patent No.: US 6,796,718 B2
(45) Date of Patent: Sep. 28, 2004

(54) ELECTROMAGNETIC LINEAR OPTICAL POSITIONER

(75) Inventors: Peter Jones, Balerna (CH); Kurt Hug, Le Landeron (CH); Urs Maag, Solothurn (CH)

(73) Assignee: Microcut AG, Bei Biel (CH)

( * ) Notice: Subject to any disclaimer, the term of this patent is extended or adjusted under 35 U.S.C. 154(b) by 158 days.

(21) Appl. No.: 10/231,289

(22) Filed: Aug. 30, 2002

(65) Prior Publication Data

US 2003/0231837 A1 Dec. 18, 2003

(30) Foreign Application Priority Data

Jun. 12, 2002 (WO) .............................. PCT/CH02/00317

(51) Int. Cl.[7] .............................. G02B 6/38; G02B 6/35
(52) U.S. Cl. ........................................ 385/57; 385/17
(58) Field of Search .......................................... 385/57

(56) References Cited

U.S. PATENT DOCUMENTS

| 5,042,889 A | 8/1991 | Benzoni |
| 5,546,063 A | 8/1996 | Hoffman |
| 5,833,211 A * | 11/1998 | Berling .................. 251/129.15 |
| 6,094,293 A | 7/2000 | Yokoyama et al. |
| 6,246,146 B1 * | 6/2001 | Schiller ...................... 310/268 |
| 6,296,397 B1 * | 10/2001 | Bavington et al. ............ 385/53 |
| 6,577,779 B2 * | 6/2003 | Watanabe ..................... 385/11 |

FOREIGN PATENT DOCUMENTS

| DE | 36 08 134 A1 | 9/1987 |
| JP | 05 113543 A | 5/1993 |
| JP | 06 011655 A | 1/1994 |
| JP | 2001 235690 A | 8/2001 |

* cited by examiner

Primary Examiner—John D. Lee
Assistant Examiner—Tina M Lin
(74) Attorney, Agent, or Firm—Oliff & Berridge, PLC (57) ABSTRACT

An electromagnetic micro positioner, e.g. for use in fibre optics, is operated by a ceramic piston (8) mounted within a ceramic cylinder (5). The piston (8) is moved by a permanent magnet (9) and an electromagnetic circuit (1/2). By changing the coil (2) polarity the piston (8) will either be attracted or repelled to its top or bottom position. In particular the core (1), capable of polarity reversal, has a magnetic remanence by means of which the movable piston (8) is fixable in one of the two predefined positions when the coil (2) is not energized.

17 Claims, 7 Drawing Sheets

ELECTROMAGNETIC LINEAR OPTICAL POSITIONER

FIELD OF THE INVENTION

The present invention relates to a micro linear positioner, particularly developed for optical switches, and a manufacturing method for such micro linear positioners and/or optical switches. An electromagnetic coil moving a magnet between two latched positions in the device controls the switch-path of the positioner.

DESCRIPTION OF RELATED ART

Many modern optical systems use light beams, usually laser-generated, to carry various types of information. Within the optical system, a light beam may alternate between travelling in free space and/or travelling in a fibre or another optical conductor. Amongst many other applications, the technology can be used for example to combine computers with mechanical devices such as sensors, valves, gears, mirrors, and actuators, etc. Many optical systems, such as fibre-optic micromechanical devices, e.g. in telecommunication systems etc. utilizing optical fibres, require the use of optical switches for selectively coupling signal sources to one or more destinations. In the field of micro-technology, micro-electromechanical systems (MEMS) switches formed on single-crystal silicon wafer substrata are used for the coupling of the signals. These optical switches are normally actuated by thermal, piezoelectric, or electrostatic means embedded in the silicon wafer substrate. However, many fibre-optic micromechanical devices do not fit that small order of magnitude, and micromechanical optical switches of larger dimensions are needed where thermal or piezoelectric actuators no longer can be used. Therefore in the field of fibre-optic communications, there is a need for electromechanical micro-actuated optical switches. The function of the switch is to direct/redirect laser beams from one channel to another within a maximum time of 10 ms. These switches are typically electromechanical and operate by moving a mirror or filter to either permit or deviate passage of a laser beam through a gate. The switch toggles between two latched positions to operate as a binary switch. By placing the switches in a matrix or an array coupled by fibre-optic collimators rendering divergent or convergent rays more nearly parallel, it is possible to control the passage of information through the matrix. In planar optical components, such a matrix can be realized by positioning the switches, each having a mirror or filter in a diagonal slot formed in the intersection of crossing light paths having ports facing the slot. The mirror is moved laterally to reflect incoming light from one fibre to an adjacent fibre communicating with the slot to perform a switching function. Such devices for e.g. a 4×4 input/output switch module require a matrix of 16 switches, i.e. the number of required switches goes with the square of the input and output slots, if the matrix is symmetric in input and output slots. In the case of a 4×1 or 2×1 input/output switch module, the number of required switches is input x output As mentioned, in optical systems, a light beam may alternate between travelling in free space and travelling in a fibre. This free-space-to-fibre coupling often occurs in the context of an optical switch. It is important for a switch that the free-space-to-fibre coupling be efficient to avoid unnecessary losses of light. Coupling efficiency is especially important in optical systems where light beams are sent through one collimated fibre to another collimated fibre. If the free-space-to-fibre coupling is not efficient then the amount of light coupled through the fibre might be insufficient for the intended purpose. Therefore to maximise the amount of light coupled to the fibre, it is desirable to make the switch as small as possible due to the limited distance through which a laser beam can travel in free space between two collimators. In addition a smaller switch design permits configuring more switch devices to form a single matrix or array of switches. Switch matrices can in turn also handle more switches, thereby permitting the design of more sophisticated gates.

However, current micro positioner design places limits on switch size reductions. Current micro positioners that produce a linear movement typically have a casing size of 11 mm in length with a 2 mm stroke. Permanent magnets are commonly arranged at opposite ends of the coils to hold a moving element in place (latched position) when the device is not energized. This requires space to prevent interference between the two different magnetic fields created by the two permanent magnets. This need for separation effectively places a lower size limit on micro positioners with two permanent magnets. Moreover, since the number of required switches in the matrix goes by the square of the input and output slots, respectively, the size of the switches can be an important feature for the realization of a planar optical component (e.g. a 16×16 input/output switch module requires already 256 switches). Therefore, although prior devices based on current micro positioners provide switching functions, they are difficult to manufacture and limited in the reduction of their size which causes the aforementioned problems. Furthermore, current micro positioners may be subject to temperature and environmental fluctuations, particularly because they employ materials that can expand and contract due to temperature fluctuations.

SUMMARY OF THE INVENTION

It is an object of the present invention to provide a smaller micro positioner which does not exhibit the above-described drawbacks. In particular, it should be possible for the positioner to maintain performance and reliability despite being of smaller size. It is a further object of the present invention to permit the micro positioner to be scaled down properly, maximise the efficiency of transmitting light through an optical component with a matrix of switches, reduce switching time to a maximum of 5 ms, and, as a final object, to also enhance reliability by the selection of low friction and low thermal expansive materials.

According to the present invention, this object is achieved particularly though the elements of the independent claim. Moreover, further advantageous embodiments follow from the dependent claims and the specification.

The objects of the invention are also achieved in particular in that an electromagnetic positioner or actuator comprises a piston, which piston is movable between a first and a second predefined position and which piston is held by a piston guide, the movable piston comprising a permanent magnet directed perpendicular to the direction of movement the piston comprising an electromagnetic coil, capable of polarity reversal, in the direction of movement of the piston, by means of which coil, in accordance with its magnetisation, the piston is movable from the one predefined position into the other predefined position, and the coil core, capable of polarity reversal, possesses a magnetic remanence by means of which the movable piston is fixable in one of the two predefined positions when the coil is switched off, i.e. not energized. The piston can be of cylindrical design with a cylindrical piston guide. It can also have a different shape such as, e.g. rectangular. The permanent magnet can be disposed on the piston at the end, for example, it also being conceivable for it to be integrated in the piston at a different place. It can be advantageous, if said permanent magnet and/or said electromagnetic coil are axially magnetized in the direction of motion of said piston. This has inter alia the advantage that the application of force by means of the magnet can be maximized. The permanent magnet of the piston can have e.g. an inductance (B) of 1.2–1.6 T and a coercive field of 940 000–1 000 000 A/m. This has the advantage that, with the typical dimensions for a micro linear positioner, it can correspond to the required signal strength. The magnet core, capable of polarity reversal, can consist e.g. at least partially of a semi-hard magnetic material. The piston and the magnet coil with magnetic core can be separated in the piston e.g. through spacers, which are installed between the piston guide and the magnet coil with the coil core. This has inter alia the advantage that during positioning the piston in the first position, the magnet coil with coil core are not damaged and a predefined spacing is kept between coil core and permanent magnet. In a preferred embodiment, the piston guide is achieved by means of a housing of the piston. Since, in contrast to the state of the art, a magnetic core, capable of polarity reversal, with remanence, is used, instead of two magnets, to bring the piston into one of the two positions, the piston can be of much smaller construction and more compact, which also means shorter reaction times for the piston. Smaller and more economical optical switches can also be created thereby.

In one embodiment, these objects are achieved by the invention in that an electromagnetic device is used which is composed of a permanent magnet and an electromagnetic coil mounted on a special half hard magnetic core. As we can reverse the polarity of the coil and of the special magnetic core, the magnet will either be attracted to the magnetic core, or be repelled from it. This results in a latched position in both directions. A ceramic cylinder and piston are attached to the coil core holder. The piston, with the magnet attached to it, is either attracted to the magnetic core, or is repelled from the magnetic core. Therefore as a function of the position of the actuator magnet, the piston is moved from one position to another. The piston moves a mirror or filter in one application of this micro positioner. The piston protrudes through one end of the ceramic cylinder. The cylinder guides reciprocating motion of the piston, its uppermost position is against a ceramic wedge and its lowermost position is against a ceramic ring. Energizing the electromagnetic coil operates the micro actuator. The actuator magnet is situated on the piston, and is in one of the two end positions, held or repelled by the magnetic core. Energizing the coil will either attract or repel the actuator magnet, this depends on the electrical polarity. The coil may later be energized in the opposite electrical polarity in order to move the magnet and piston in the opposite direction. This embodiment variant has the same advantages as the preceding one.

In one embodiment said piston is extendable axially outside of said housing of the electromagnetic positioner or actuator. This embodiment variant has the advantage, among other things, that the positioner is suitable for use in optical switch modules, an optical element, such as a mirror or filter, being installed on the part extending over the housing of the piston Therefore, in a further embodiment variant, the part protruding out of the piston housing comprises an optical element. The optical element can comprise a mirror and/or a filter element, for example. This has inter alia the advantages already mentioned. In the case of the previous embodiment variant, the protruding part can of course serve completely different purposes, such as e.g. the activation of a process, etc.

In another embodiment variant, the piston and/or the piston housing is made at least partly of ceramic. This has the advantage, among other things, that the friction resistance in the positioner can be greatly reduced and the components have a much smaller thermal expansion coefficient. On the one hand, this enlarges the possible field of application for the positioner. On the other hand, the wear and tear within the positioner is moreover reduced.

In a further embodiment variant, the piston comprises a lateral notching and the piston housing has a stop element by means of which the second predefined position of the piston can be set, the stop element abutting the piston at the notching. This has the advantage, among other things, that the positioner is easy to achieve and produce. This also brings with it, among other things, a reduction of the manufacturing costs.

In an embodiment variant, the stop element has magnetic properties which assist to hold the piston in the second position. This has the advantage inter alia that possible recoil momentum, occurring through the stopping of the piston in the second position, can be compensated.

In an embodiment variant, the magnet coil with magnetic coil core has an impulse time 2 to 3 times longer than necessary for moving the piston from one position into the other position. This has the advantage, among other things, that possible recoil momentum of the piston when impinging upon the spacer or the stop element can be compensated.

At this point, it should be noted that besides the micro linear positioner and the optical switches based on micro linear positioners according to the invention, the present invention also relates to a manufacturing method for such micro linear positioners and/or optical switches and/or optical switch modules.

Other features and advantages of the present invention will become apparent from the following description of the invention, which refers to the accompanying drawings, i.e. two embodiments of the present invention are described below by means of examples. The examples of the embodiments are illustrated by the following enclosed figures:

DETAILED DESCRIPTION OF EMBODIMENTS OF THE INVENTION

Figure 1:
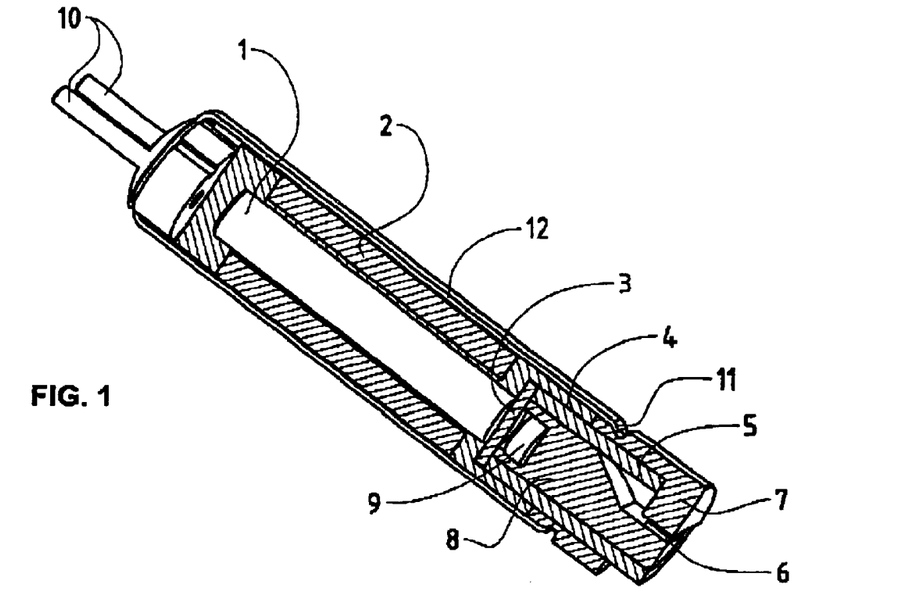
FIG. 1 is a longitudinal cross-sectional view of a micro actuator or positioner constructed in accordance with a preferred embodiment of the present invention showing the piston of the actuator latched in one of its two positions.
Figure 2:
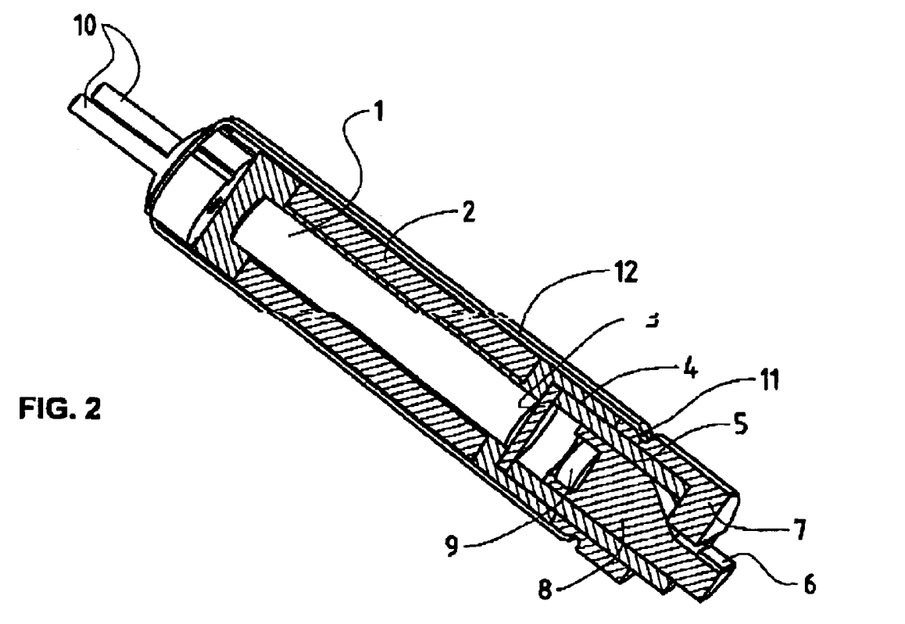
FIG. 2 is a cross-sectional view of the micro actuator or positioner of FIG. 1 showing the piston of the actuator in the other of its two positions.

Referring now to the drawings, wherein like numerals indicate like elements, FIGS. 1 up to 6 show two different embodiments of a micro positioner or actuator according to the present invention. The presently preferred embodiment of the micro actuator or positioner may be used in an optical switch module 21 to control the direction of laser beams between two collimators (not shown). However, its use is not limited. It can be used in any environment requiring a latched movement, especially one requiring a linear actuator or positioner of small size and fast switching time.

Figure 7:
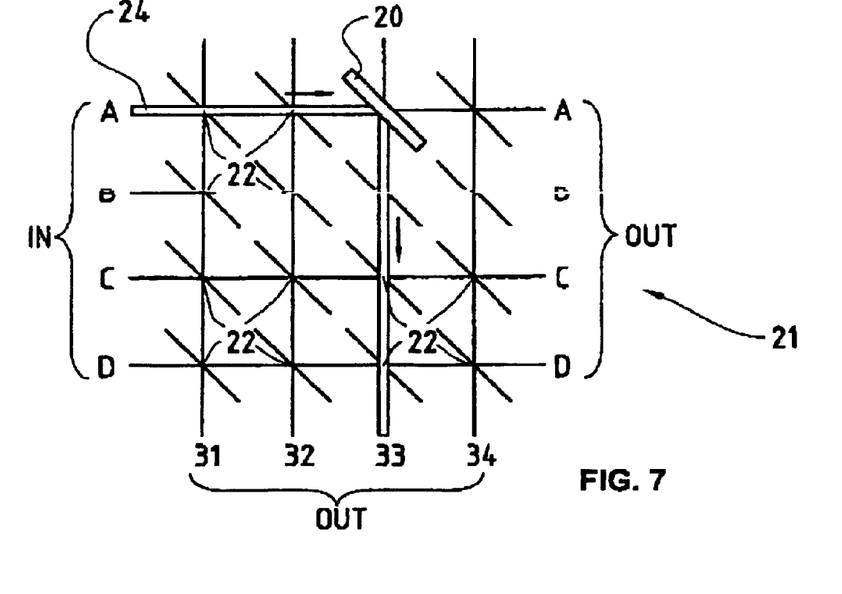
FIG. 7 is a schematic diagram showing an optical switch module 21 with an array or matrix of fibres in the X/Y plane which embodies a plurality of optical switches of the present invention.
Figure 11:
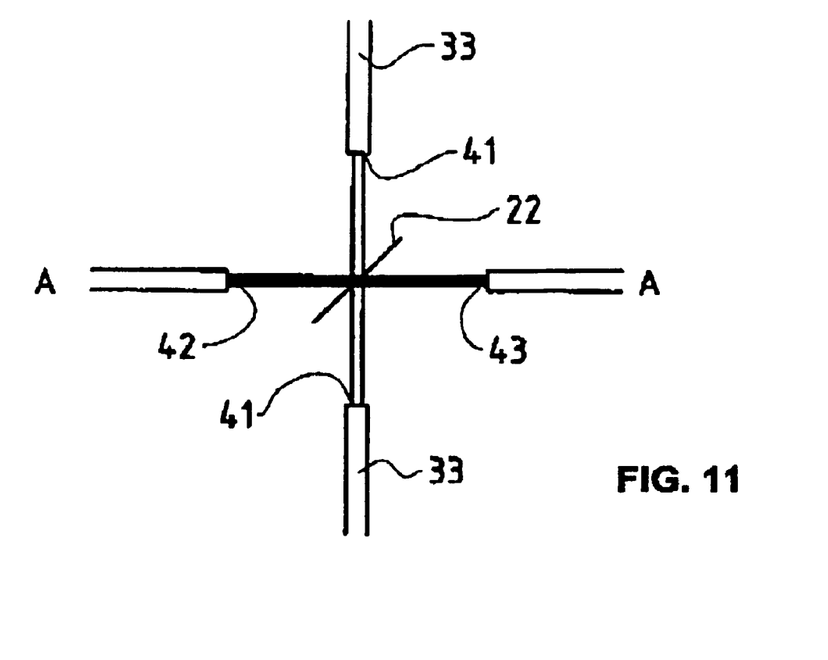
FIGS. 11 and 12 are each an enlarged view of FIG. 7 showing details of the crossing of pathways 33 and A in a generalized representation.
Figure 12:
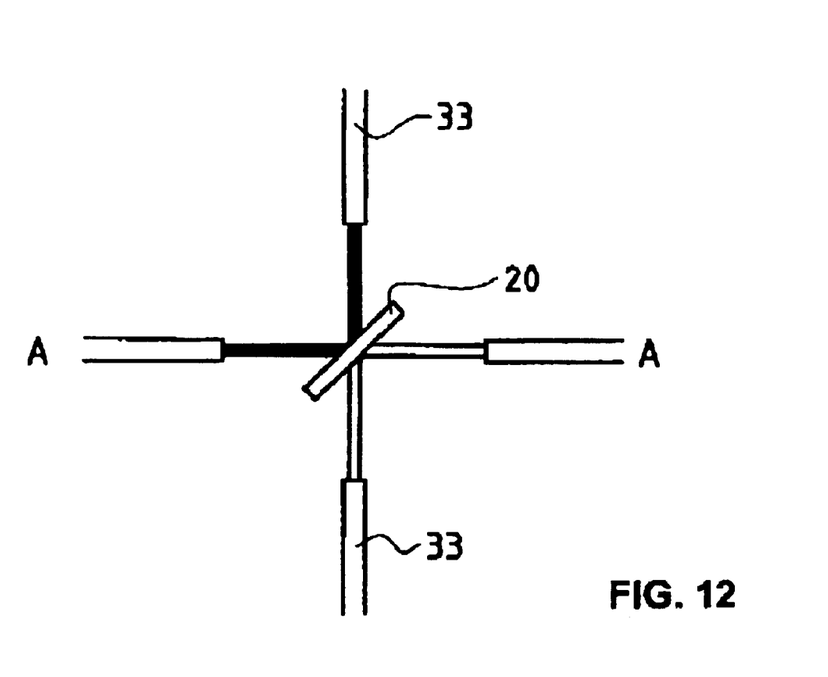

FIG. 7 is a schematic diagram showing such an optical switch module 21 with an array or matrix of fibres in the X/Y plane, such fibres A, B, C, and D, extending horizontally and crossing fibres 31, 32, 33, and 34 extending vertically in the diagram. At each of the intersections of the fibres there is a slot 22, as also shown in the enlarged view of FIGS. 11 and 12, which defines the facing ports 42 and 43 of fibres A and 40 and 41 of fibres 33. Movably positioned within each slot 22 of the switch module 21 for movement in a vertical direction (i.e. in and out of the plane of FIGS. 7, 11, and 12) is a micro actuator or positioner 20, i.e. a optical switch embodying the present invention. FIGS. 11 and 12 show also the additional connection on the other side of the matrix which is not shown in FIG. 7. Thus, each of the fibres intersections, shown in the switch 21 of FIGS. 1 to 6, will include a micro actuator 20 having a micro mirror which, when not actuated, permits optical input signals on, for example, fibres A to pass from port 42 to port 43 to conduct signals along fibres A from its input to its output. If a micro positioner or actuator 20 according to the present invention, which is serving as an optical switch, is actuated signals from the input of fibres A at port 42 are reflected by the mirror of the micro positioner 20 onto port 41 of fibres 33 to switch the signal from input A to output 33.

Figure 8:
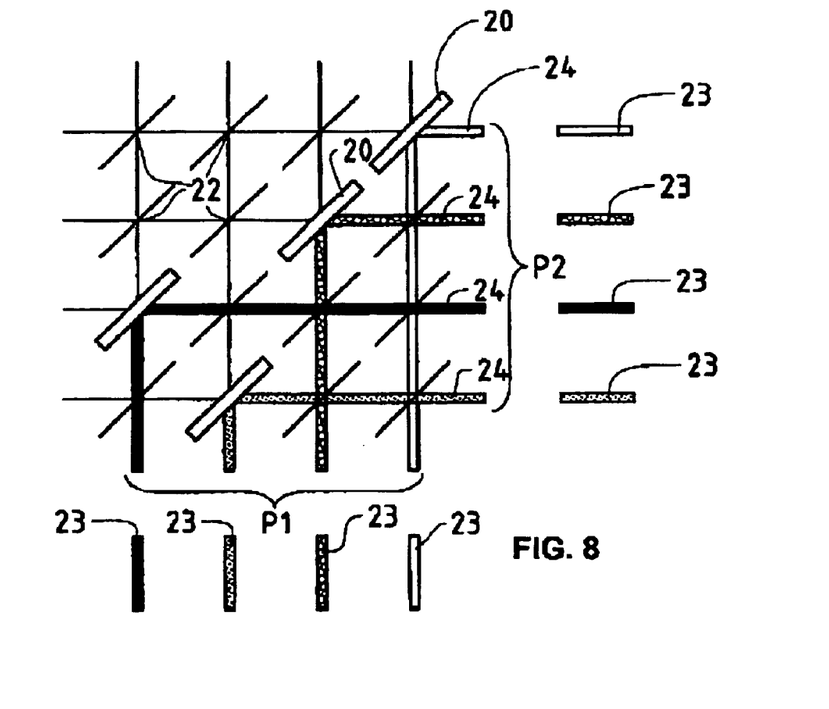
FIG. 8 is a schematic diagram showing an optical switch module 21 with the coupling of multiple input and output lines of two planes P1/P2 which embodies a plurality of optical switches of the present invention.
Figure 9:
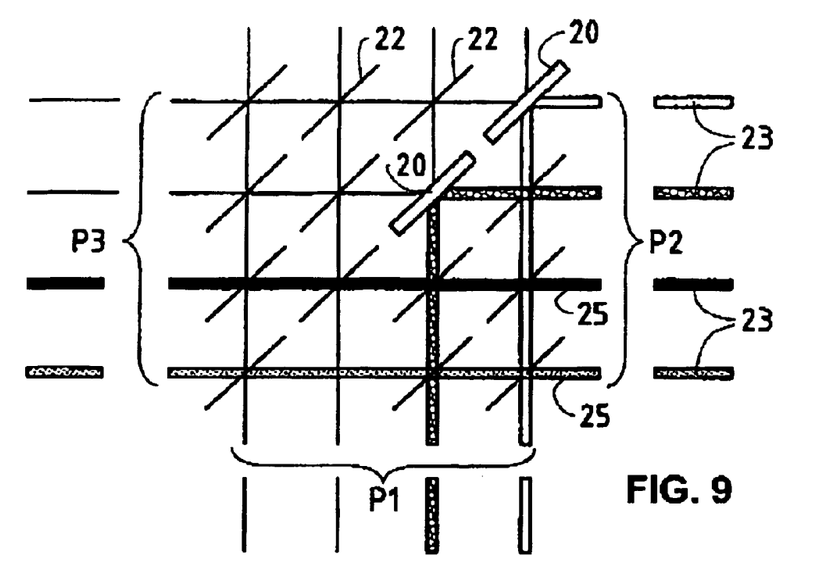
FIG. 9 is a schematic diagram showing an optical switch module 21 with the coupling of multiple input and output lines of three planes P1/P2/P3 which embodies a plurality of optical switches of the present invention.
Figure 10:
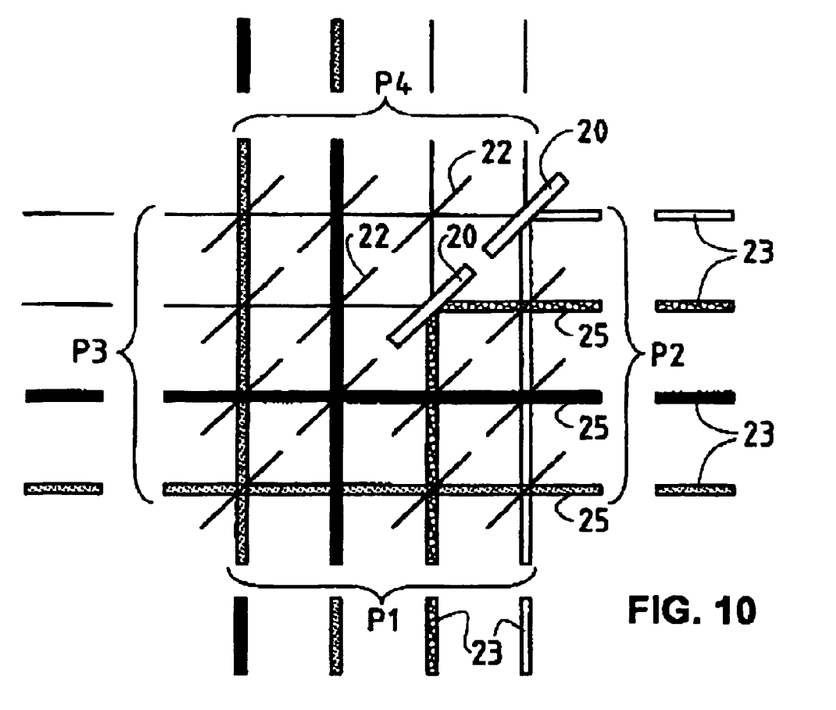
FIG. 10 is a schematic diagram showing an optical switch module 21 with the coupling of multiple input and output lines of four planes P1/P2/P3/P4 which embodies a plurality of optical switches of the present invention.

Alternatively, the micro actuator 20, instead of including a micro mirror, may include a filter or defraction gratings, to selectively block/pass certain wavelenghts on a single fibres providing an "on/off" function. More typically, a switching network, however, is provided such that multiple input lines can be selectively coupled to multiple output lines. Different embodiments of optical switch modules 21 including optical switches 20, i.e. micro actuator according the present invention, are shown in FIGS. 7, 8, 9, and 10. FIG. 8 shows the coupling of multiple input and output lines or fibres 23 of two planes, which are planes P1 and P2, respectively, where as the reference numbers 24/25 denote the guided light- or laser beams. FIG. 9 shows the coupling of multiple input and output lines 23 of three planes, which are planes P1, P2 and P2, respectively. FIG. 10 shows the coupling of multiple input and output lines 23 of four planes, which are planes P1, P2, P3, and P2, respectively.

The micro positioner of the present invention shown in FIGS. 1–6 includes a cylindrical core holder 4, a coil core 1, and an electromagnetic coil 2, positioned along the axis of the housing. The electromagnetic coil 2 is mounted on the coil core 1, which is made of a half hard magnetic material. The half hard material can be based e.g. of a FeCrCo allay, CoFeV alloy, CoFeNi alloy or FeCrCoNiMo alloy or another semi-hard or half hard material. The electromagnetic coil 2 is controlled and supplied with current by electric supply devices (not shown) through the electrical connections 10. A permanent magnet 9 is placed between the spacer 3 and the piston 8. The permanent magnet 9, electromagnetic coil 2 and coil core 1 cooperate to toggle the piston 8 between two latched positions, one to the bottom end of the passage in the cylinder 5 (shown in FIG. 2) and one to the top end of the passage in the cylinder 5 (shown in FIG. 1). In order to fix the second predefined position, the piston 8 can comprise e.g. a lateral notching and the piston housing 5 can comprise a stop element 7, the piston 8 abutting in the second position with the notching the stop element 7. The embodiment variant of FIGS. 1, 2 and 3 has in particular the advantage over the embodiment variant of FIGS. 4, 5 and 6 that the stop element 7 does not have to be fixed with adhesive. When considering the embodiment variant of FIGS. 4, 5 and 6 it is moreover clear that with the cylindrical stop element 7 the connection points for applying an adhesive between stop element 7 and the piston 5 are extremely limited. This can lead to a poor bonding of the stop element 7. On the other hand, with the embodiment variant of FIGS. 1, 2 and 3, no adhesive at all has to be used, and a secure bonding of the stop element 7 is possible, which has great advantages, among other things for the manufacture and maintenance of micro positioners. As already described, the stop element 7 itself can have magnetic properties in order to compensate recoil momentum (check terms) of the piston 8. Piston 8 with attached mirror or filter 6 is positioned accurately at the top of the passage through wedge 7. The various elements of the micro positioner are installed in the housing 12 using adhesive (FIGS. 4, 5, 6) or a notching construction as in FIGS. 1, 2, 3 with the notching 11.

The permanent magnet 9 serves two purposes. It cooperates with the coil 2 to reciprocatingly move the piston 8 between its first and second latched end positions when a driving current is applied to the coils. The magnet 9 also latches the piston 8 in place axially once the driving current is removed. This can be understood with reference to FIGS. 1 and 2. When the piston 8 is latched in the position against the top end of the passage in the housing, as shown in FIG. 1, at this time no driving current is being applied to the coil 2, and the piston is held in place by the magnetic field generated by the permanent magnet 9. In order to move the piston 8 into the second latched position of FIG. 2, appropriate driving currents are applied to the coil 2. The polarity of the current is determined by the direction in which the piston 8 is to be moved, by the direction that the coil is wound and by the polarity of the electrical connection to the coil. Based on the foregoing consideration, a driving current is applied to the coil 2 to generate a magnetic force which is of the opposite polarity as the magnetic field induced by the permanent magnet 9. This creates an attractive force which will urge the piston 8 to move. This force quickly moves the piston 8 to the second latched position shown in FIG. 2 against the bottom end of the passage in the housing. After the piston 8 reaches the second latched position shown in FIG. 2, the driving current is removed from the coil 2 and the permanent magnet 9 locks the piston 8 in the second latched position. When the piston 8 is to be returned to the first latched position, appropriate currents, whose polarity is opposite those applied to move the piston 8 from one latched position to the other latched position, are applied to the coil 2. An appropriate control circuit connected to the coil is used to generate the driving signals for the coil and to control the timings of those signals. In most applications, the micro positioner should have a fast response time of less than 5 ms.

Figure 3:
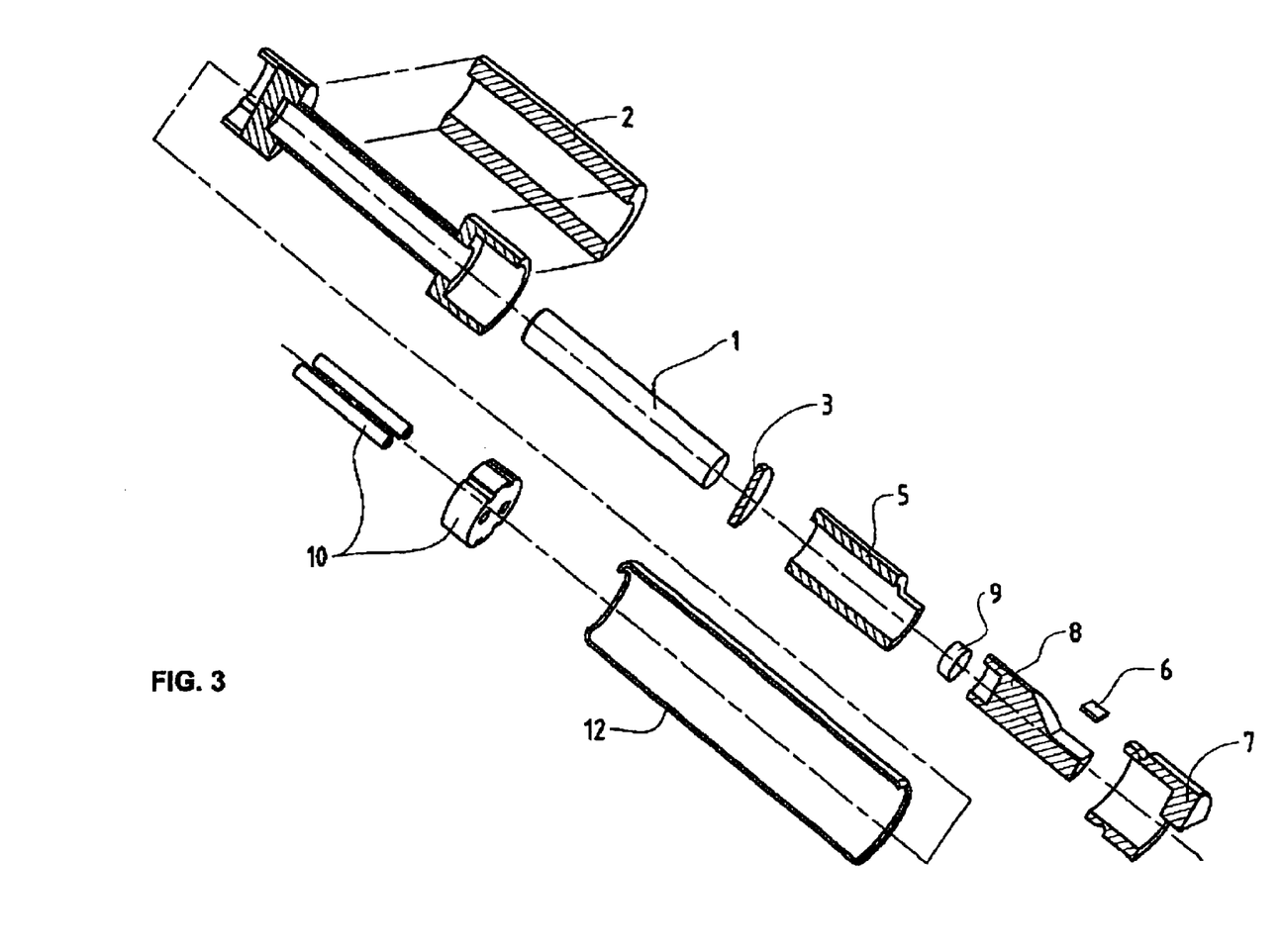
FIG. 3 is a perspective view, partially broken away, of the micro actuator or positioner of FIG. 1.
Figure 4:
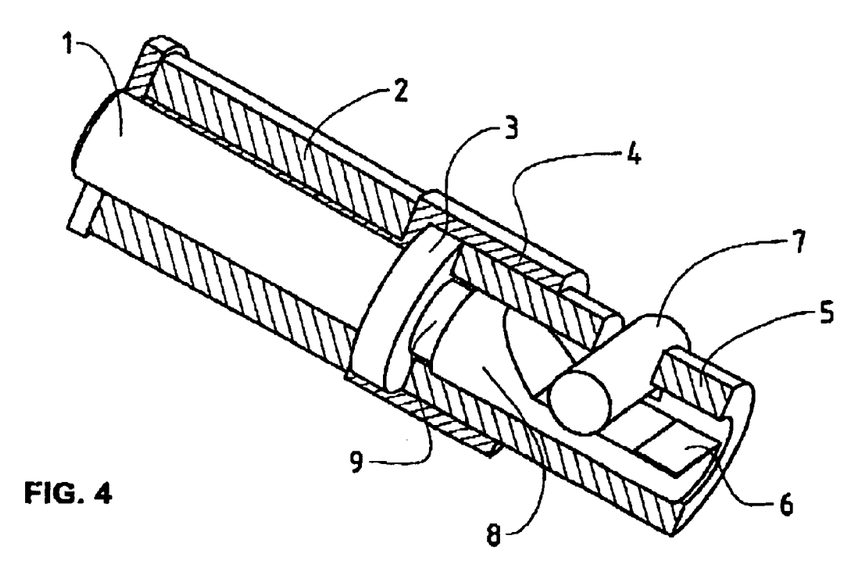
FIG. 4 is a longitudinal cross-sectional view of another embodiment of a micro actuator or positioner, constructed in accordance with a preferred embodiment of the present invention, showing the piston of the actuator latched in one of its two positions.
Figure 5:
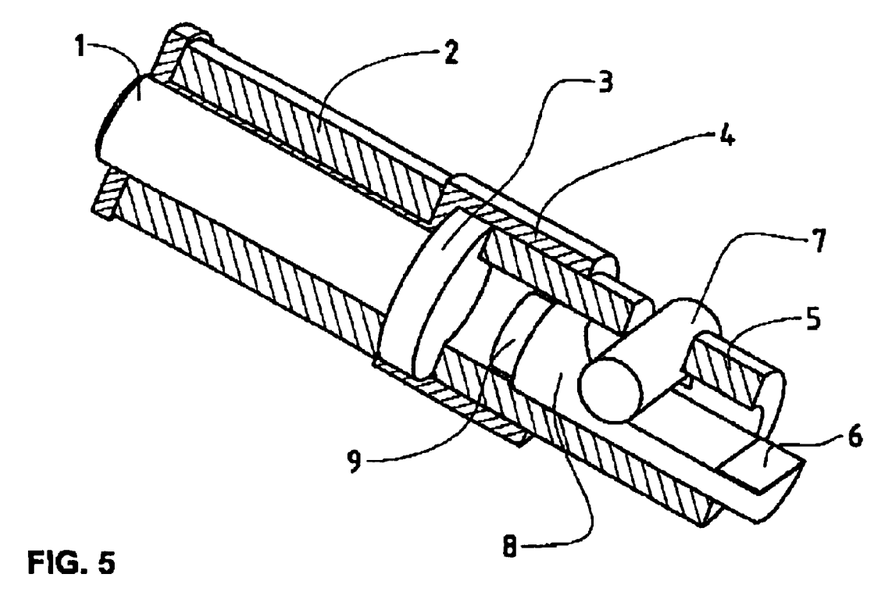
FIG. 5 is a cross sectional view of the micro actuator or positioner of FIG. 4 showing the piston of the actuator in the other of its two positions.
Figure 6:
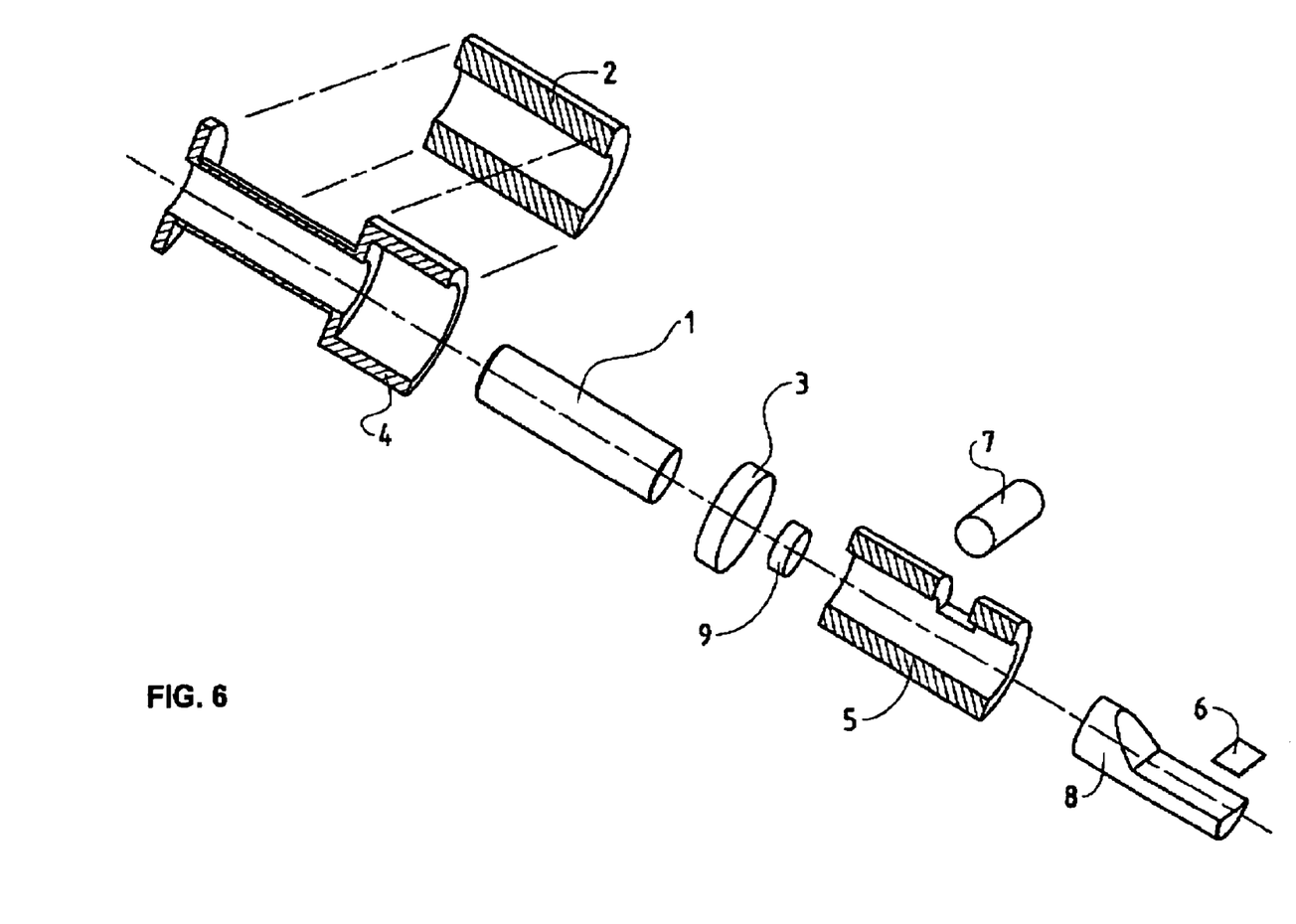
FIG. 6 is a perspective view, partially broken away, of the micro actuator or positioner of FIG. 4.

Piston 8 moves quickly between its opposite latched positions. The momentum build up by the movement of the piston 8 may be sufficient to cause the piston 8 to rebound when it strikes the wedge 7 or the spacer 3 which define the opposite ends of the passage for the piston. To avoid this rebound and possible impact damage, the electrical impulse will be kept on for at least twice the switching time, typically for 12 ms. As shown in FIG. 3, the permanent magnet 9 is preferably made of a material such as e.g. Nd—Fe—B alloy (e.g. the Vacodym 510HR, which has a remanent inductivity of 1.41 T and a coercivity of 980,000 A/m) or $SmCo_5$/$Sm_2Co_{17}$ alloy (e.g. Vacomax) etc. This permanent magnet is axially magnetized and is attached to the bottom end of piston 8.

Dimensions and operating characteristics of an example of a micro positioner according to the invention are now described. To establish context for this invention, known micro positioners which produce a linear movement have a casing typically on the order of 20 mm in length and about 6 mm diameter, a stroke of 2 mm, a switching time of typically 10 ms.

For a micro positioner according to the present invention, the casing length may be 10 mm with a stroke of 0.5 mm. Casing lengths of 12 mm or 13 mm are possible. In either example, the casing has a diameter of about 2.45 mm and specifically 2.5 mm. Because the moving parts may comprise ceramic material, there is almost no thermal expansion or contraction. The transversal guidance has a precision of less than 1 $\mu$m, for example, from −40° C. and 80° C.

The wire coil has 540 turns of a wire of 45 $\mu$m. The coil has a diameter of 2.4 mm. There is a power dissipation of 750 mW at 5 Vdc and a coil current of 0.150A. When the switch path is 0.5 mm, the supply voltage would be 5 Vdc. The current at the maximum would be 0.150 A. The square wave impulse time would be 12 ms and the switch path is achieved in 5 ms. The latching force at both ends is >15 mN without any applied voltage.

The forgoing parameters are given by way of example, and not are intended to limit the scope of the invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

| List of Reference Numerals | |
|---|---|
| 1 | Coil core |
| 2 | Coil |
| 3 | Spacer |
| 4 | Core holder |
| 5 | Cylinder |
| 6 | Mirror or filter |
| 7 | Stopper |
| 8 | Piston |
| 9 | Magnet |
| 10 | Electrical connections |
| 11 | Notching |
| 12 | Housing |
| 20 | Micro actuator or positioner with mirror or filter |
| 21 | Optical switch module |
| 22 | Slot |
| 23 | Fibre |
| 24/25 | Light- or Laser beam |
| 31/32/33/34 | Fibre |
| 40/41/42/43 | Port |

What is claimed is:

1. An electromagnetic positioner, with a piston which piston is movable between a first and a second predefined position and is held by a piston guide, characterised
   in that the movable piston comprises a permanent magnet oriented in the direction of movement,
   in that the positioner comprises an electromagnetic coil capable of polarity reversal with a core capable of polarity reversal in the direction of movement of the piston, by means of which coil, in accordance with its magnetization, the piston is movable from the one predefined position into the other predefined position,
   in that the core, capable of polarity reversal, has a magnetic remanence by means of which the movable piston is fixable in one of the two predefined positions when the coil is not energized.

2. The electromagnetic positioner according to claim 1, wherein said piston is extendable axially outside of said piston guide.

3. The electromagnetic positioner according to claim 1, characterised in that the piston is designed cylindrical in a cylindrical piston housing serving as piston guide.

4. The electromagnetic positioner according to claim 2, characterised in that the piston and/or the piston guide are made at least partly of ceramic.

5. The electromagnetic positioner according to claim 3, characterised in that the piston and/or the housing are made at least partly of ceramic.

6. The electromagnetic positioner according to claim 1, characterised in that the piston and/or the piston guide are made at least partly of ceramic.

7. The electromagnetic positioner according to claim 1, characterised in that the permanent magnet is disposed at the end of the piston.

8. The electromagnetic positioner according to claim 4, characterised in that the positioner comprises a spacer disposed between the piston guide and the coil with the coil core.

9. The electromagnetic positioner according to claim 4, characterised in that the piston comprises a lateral notching and the piston guide comprises a stop element by means of which the second predefined position of the piston is fixable.

10. The electromagnetic positioner of claim 1, wherein said permanent magnet and/or said electromagnetic coil is axially magnetized in the direction of motion of said piston.

11. The electromagnetic positioner according to claim 1, characterised in that the core, capable of polarity reversal, comprises a semi hard or half hard magnet.

12. The electromagnetic positioner according to claim 4, characterised in that the stop element possesses a magnetic moment for keeping the piston in the second position.

13. The electromagnetic positioner according to claim 2, characterised in that the extensible part out of the piston guide comprises an optical element.

14. The electromagnetic positioner according to claim 13, characterised in that the optical element comprises a mirror and/or a filter.

15. The electromagnetic positioner according to claim 1, characterised in that the permanent magnet of the piston has an inductance (B) of 1.2–1.6 T and a coercive field of 940 000–1 000 000 A/m.

16. The electromagnetic positioner according to claim 1, characterised in that the magnet coil with the magnetic coil core for moving the piston have an activation time 2 to 3 times longer than necessary for moving the piston from one position into the other position.

17. An optical switch module, characterised in that to couple the input and output ports the optical switch module comprises electromagnetic positioners according to claim 1.

* * * * *